United States Patent [19]

Chen et al.

[11] Patent Number: 5,751,719
[45] Date of Patent: May 12, 1998

[54] METHOD AND SYSTEM FOR DATA TRANSFER IN THE PRESENCE OF DISCONNECTS

[75] Inventors: Kuo-Wei Herman Chen, Scotch Plains; Sanjoy Paul, Atlantic Highlands; Krishan Kumar Sabnani, Westfield, all of N.J.

[73] Assignee: Lucent Technologies Inc., Murray Hill, N.J.

[21] Appl. No.: 565,526

[22] Filed: Nov. 30, 1995

[51] Int. Cl.$^6$ .............................. H04L 1/16; G08C 25/00
[52] U.S. Cl. .................. 370/473; 370/394; 371/32; 395/200.12
[58] Field of Search ........................ 370/349, 469, 370/471, 473, 474, 394; 395/200.12, 200.13, 200.14, 182.16, 182.18, 181; 371/32, 34

[56] References Cited

U.S. PATENT DOCUMENTS

| | | | |
|---|---|---|---|
| 4,617,657 | 10/1986 | Drynan et al. | 370/394 |
| 4,841,526 | 6/1989 | Wilson et al. | 371/32 |
| 5,151,899 | 9/1992 | Thomas et al. | 370/394 |
| 5,222,061 | 6/1993 | Doshi et al. | 370/394 |
| 5,245,616 | 9/1993 | Olson | 371/32 |
| 5,444,718 | 8/1995 | Ejzak et al. | 371/32 |

OTHER PUBLICATIONS

A.S. Tanenbaum, Computer Networks, pp. 10–21, Prentice Hall Software Series, 1981.

E. Ayanoglu, S. Paul, T.F. La Porta, K.K. Sabnani, R.D. Gitlin, "AIRMAIL: A Link–layer Protocol for Wireless Networks," Wireless Networks vol. 1, No. 1, pp. 47–60, 1995.

S. Aggarwal, K. Sabnani, B. Gopinath, A New File Transfer Protocol, AT&T Technical Journal, vol. 64, No. 10, pp. 2387–2411, Dec. 1985.

Primary Examiner—Hassan Kizou

[57] ABSTRACT

Methods and systems for controlling data transfer operations during a communication session between a transmitter and at least one receiver provide that data packets which have been stored at the receiver memory before a disconnect occurred remain stored in therein in the presence of the disconnect to avoid the need for retransmitting data packets upon re-establishment of a communication link. Data representative of those data packets already stored at the receiver memory is maintained for purposes of synchronizing data packet transmission from the transmitter for completing data file transfer. Data control instructions for implementing storage of data packets and tracking the progression of data packet transmissions when a disconnect occurs may suitably included in an existing protocol layer of a communication system or as an additional protocol layer added to the operating system of the communication system.

18 Claims, 8 Drawing Sheets

METHOD AND SYSTEM FOR DATA TRANSFER IN THE PRESENCE OF DISCONNECTS

FIELD OF THE INVENTION

This invention relates generally to communication systems which provide for the transmission of sequentially numbered data packets from a transmitter to a receiver. More particularly, the present invention concerns techniques for controlling data transfer operations for minimizing data retransmissions when a disconnect occurs during the transmission of sequentially numbered data packets from a transmitter to a receiver.

BACKGROUND OF THE INVENTION

Data communication systems which provide for the transmission of a data file using sequentially numbered data packets are known. These systems conventionally operate according to standard communication system control procedures known as protocols. The protocols define the system operating parameters associated with transferring data over a communication link from a transmitter to a receiver during a communication session.

A standard communication operating system is typically arranged as a hierarchy of protocol layers for controlling data handling operations during data transfer. For example, a point-to-point signal transfer across physical media, such as a cable, is controlled by protocol layers known as physical or data link protocol layers, while signal transfer on an end-to-end basis, in other words, between a transmitting and receiving communication device, is controlled at protocol layers known as transport or application protocol layers. [See A. S. Tannenbaum, *Computer Networks*, pp. 20–21, 1981 citation, to be provided by inventor], incorporated by referenced herein, for a detailed description of the operations performed at different protocol layers in a communication system.

In a communication system, the protocols establish a virtual connection between a transmitting communication device and at least one receiving device for transferring data from the former to the latter during a communication session. For example, the protocols may provide that a personal computer may transfer data packets of a data file through a wired interconnecting network and ultimately to a wireless mobile unit, such as, for example, a portable laptop computer or personal digital assistant.

During the course of a communication session, a communication link between a transmitting and a receiving device may become disconnected due to breakdowns in data links or the network, or poor signal transmission between the former and latter. These disconnects are known to occur very frequently in a mobile networking environment. For example, a wireless radio channel may temporarily become nonfunctional or the battery in a mobile receiver may become too weak, causing a disconnect to occur.

When a disconnect occurred in a prior art communication system, a protocol associated with receiving, storing and processing data received during a communication session, such as, for example, the data transfer application protocol associated with reconstructing images or text from a data file, often became destabilized. The destabilization of such a protocol layer interrupted the normal processing operations of the protocol and, in some circumstances, caused the loss of any data previously received and stored in the memory of a receiving device.

The loss of stored data which has been received as part of a data file transfer is especially disadvantageous where a protocol requires that an entire data file be stored before the data file may be processed. For example, a data transfer application protocol layer associated with reconstructing images from data may require an entire data file to be received and stored in memory before the data file is processed for the re-creation of images. The necessity for retransmitting an entire data file because of a disconnect, thus, severely degrades throughput and becomes especially burdensome where large amounts of data must be retransmitted.

SUMMARY OF THE INVENTION

The present invention is directed to methods and systems for controlling data file transfer operations in a communication system during a disconnect to avoid unnecessary retransmissions of data packets once a communication link is re-established.

In one aspect of the present invention, an existing protocol of a communication operating system is modified to include programmed instructions, or a recovery module, for controlling data handling operations in the event a disconnect occurs during data file transfer. During a communication session in the system, a data file is transmitted from a transmitting device to a receiving device as a numbered sequence of data packets. When a disconnect is detected, the recovery module provides that data packets received and stored at the receiving device prior to the occurrence of the disconnect are retained in memory therein. The data packets are stored in the memory to permit that their respective sequence numbers may be obtained subsequently. After a connection is re-established, the sequence numbers of the data packets which have been previously received and retained in the memory of the receiving device during the disconnect are utilized for indicating to the transmitting device which data packets still need to be transmitted in order to complete transmission of the data file.

In another aspect of the invention, a separate and independent protocol layer, or recovery layer, is included in a communication operating system hierarchy above an existing protocol layer which may become destabilized in the event of a disconnect. The recovery layer provides, during a communication session between a transmitting and receiving device, that the receiving device maintain a record of which data packets have been received and stored. The data packets are suitably transmitted from the transmitting device using a checkpointing window for facilitating tracking and monitoring of data packets received and stored at the receiving device. Once a connection is re-established after a disconnect occurs, the transmitting device is directed by the receiving device to transmit only those data packets required for completing the data file transfer. Data packet transmission is synchronized for checkpointing window transmission based on those data packets already stored in the memory of the receiving device.

Further features and advantages of the present invention will become readily apparent to those of ordinary skill in the art by reference to the following detailed description and accompanying drawings.

DETAILED DESCRIPTION

Figure 1:
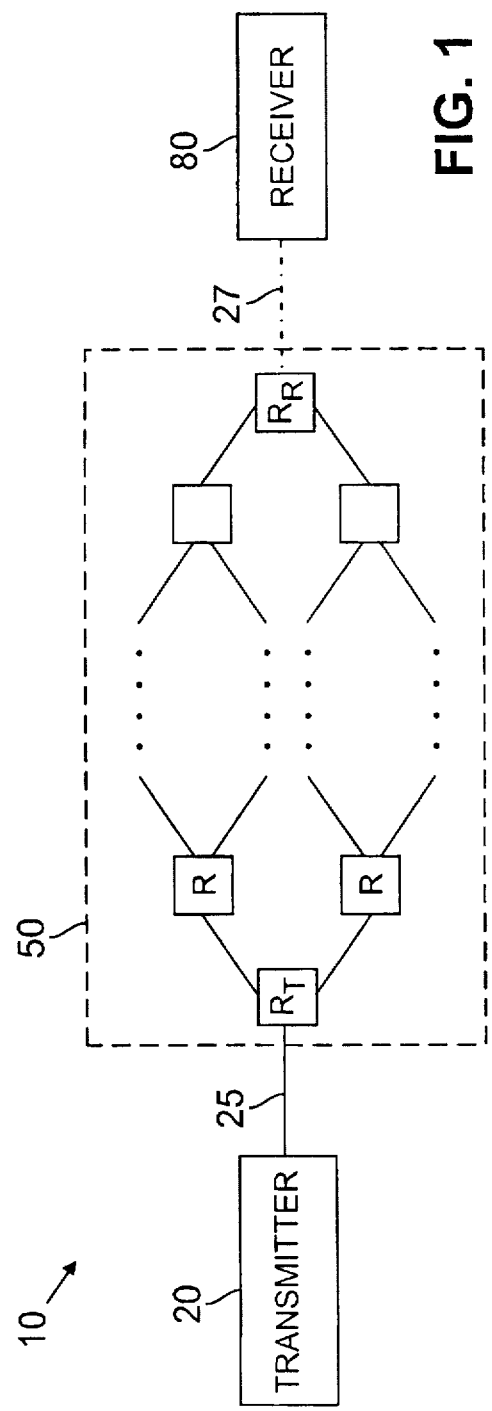
FIG. 1 shows in block diagram form an exemplary communication switching system which operates in accordance with the present invention for controlling data transfer operations in the event of a disconnect during a communication session.

FIG. 1 shows an exemplary communication system 10 which may suitably be operated in accordance with a protocol that controls data transfer operations for avoiding the retransmission of an entire data file of data packets when a disconnect occurs during a communication session, by enabling data transfer application processing to continue uninterrupted.

Referring to FIG. 1, the system 10 may suitably comprise a communication device 20 which is connected to a communication device 80 via an interconnecting network 50. The network 50 suitably comprises a plurality of routers or switching systems, R, which are interconnected to each other via land-line data links in accordance with standard techniques. The routers R are standard, well known components that may receive data signals from a communication device or router and then transmit these data signals to another router or communication device. It is to be understood that the network 50 may include wireless data links between the routers R, or there may be a combination of land-line and wireless data links which interconnect the routers R in the network 50. Further, it is to be understood that the system 10 may include additional communication devices which are connected to the network 50 using well known techniques.

Figure 2:
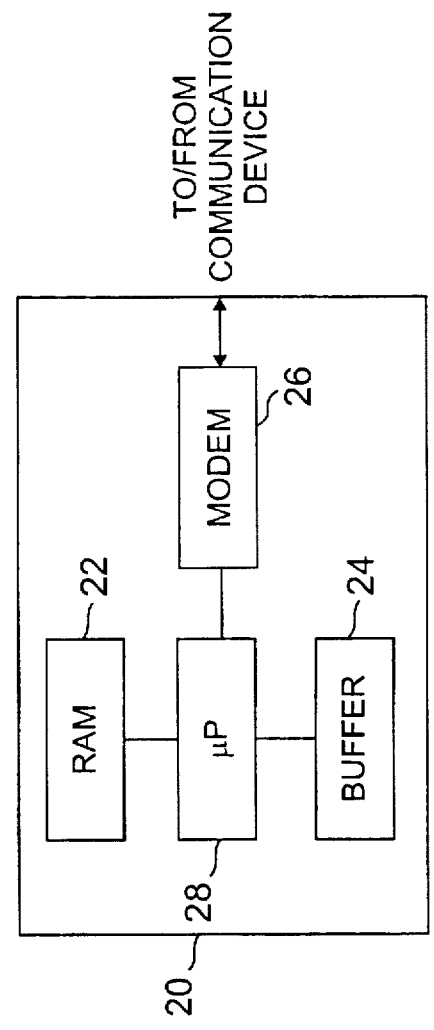
FIG. 2 illustrates an exemplary communication device in the system of FIG. 1 including functional blocks which may suitably perform operations associated with the present inventive technique of controlling data transfer operations in the event of a disconnect during a communication session.

FIG. 2 shows an exemplary embodiment of the device 20 comprising individual functional blocks. The functions these blocks represent may be provided through the use of either shared or dedicated hardware, including but not limited to hardware capable of executing software. In a preferred embodiment, the functional blocks in the device 20 comprise a random access memory (RAM) 22, a buffer memory 24 and a modem 26, all of which are connected to a standard microcontroller or microprocessor 28. As explained below, the functional blocks provide for the processing of the contents of message signals received at the device 20 and the processing of data associated with implementation of the present inventive technique. The processor 28 conventionally stores processed data results and data values received in a message signal in the RAM 22, and stores data packet information in the buffer 24. It is to be understood that the operations performed by the functional blocks and the processor 28 may be similarly performed using a single shared processor. Such a processor may comprise a standard digital signal processor and would include read only memory or other appropriate memory for storing software and performing the operations discussed below. Further, the present invention technique may be implemented using firmware or by discrete components implemented in an integrated circuit. Other suitable embodiments may be readily implemented by those of ordinary skill in the art.

Referring to FIG. 2, the modem 26 is suitably a standard component for receiving and transmitting message signals over either land lines or wireless data links. Further, the modem 26 suitably includes a processor and memory, not shown, for evaluating data packet transmission quality and invoking an interrupt, in other words, causing a disconnect in a communication link, when data transmission quality falls below a predetermined level. The buffer 24 is a conventional memory store for data packets which are either received or to be transferred during data file transfer. The RAM 22 is used for storing programmed instructions associated with the communication system protocols which control data file transmission operations. The processor 28 performs these instructions according to well known techniques. It is to be understood that additional communication devices may suitably be employed in the system 10 and that such devices will preferably, be structurally similar to and operate in a similar manner as the device 20. Operation will occur in accordance with the communication protocol. For example, the device 80 suitably includes a RAM 82, a modem 86 and a buffer memory 84, each of which is connected to a processor 88. A communication device may suitably be any electronic device, such as, for example, a personal or laptop computer or a personal digital assistant, which includes electronic hardware, such as a modem, for transmitting and receiving electronic data signals message signals over a communication network.

For purposes of illustration, the present invention is explained with reference to operations performed in the system 10 when a disconnect occurs during a communication session involving data transfer from the device 20 to the device 80. For ease of reference, the devices 20 and 80 are hereinafter referred to as the transmitter 20 and the receiver 80, respectively. It is assumed that a virtual connection through the network 50 involves connection of the transmitter 20 via a land-line data link 25 to a router $R_T$ and connection of the receiver 80 to a router $R_R$ via a wireless data link 27. For the communication session involving a data file transfer from the transmitter 20 to the receiver 80, the router $R_R$ is suitably connected through data links and routers in the network 50 for establishing a virtual communication link between the router $R_R$ to the router $R_T$, in effect, between the transmitter 20 and the receiver 80.

As more fully described in Tannenbaum, cited above, data transfer operations in a communication system are controlled by the hierarchical protocol layers of the communication operating system. A data file transferred during a communications session may contain data packets representative of a text or an image. The data file includes a plurality of sequentially numbered data packets which are transmitted sequentially during a communication session. For example, a data file may include one hundred data packets numbered DP 00, DP 01 ... DP 99 which are transmitted sequentially starting from DP 00. The data packets are suitably transmitted as message signals, wherein each message signal includes, in addition to the information contained in the data packet, data transfer processing data packets and control header information, such as the sequence number of the data packets as is conventional in the art.

For purposes of illustration, it is assumed that the communication operating system of the communication system 10 includes conventional end-to-end protocol layers called application and transport protocol layers, a network protocol layer concerned with the routing of signals within the network 50, and data link and physical media protocol layers concerned with point-to-point signal transmission, such as, for example, data signal transmission between the router $R_T$ and the receiver 80 via the link 27. In the exemplary system 10, the hierarchy of protocol layers, in descending order, includes an application protocol layer, a transport protocol layer, a network protocol layer and a data link protocol layer. It is to be understood that the system 10 may include additional protocol layers and that those layers referred to herein are described only for purposes of illustration.

In accordance with the present invention, a communication system operating protocol provides a communication system with the capability of continuing to execute data transfer application processing in the event of a disconnect for avoiding the need for retransmitting data packets which were previously correctly received and stored during the communication session before the disconnect occurred. The inventive protocol provides that the correctly received data packets remain stored in a buffer in the event of a disconnect, and that the sequence numbers of those data packets correctly received and stored are tracked for enabling that only those data packets of a data file not previously received and stored are retransmitted, or originally transmitted, once a communication link is restored. The need for retransmitting data packets which have already been correctly received and stored at a device is avoided because correctly received data packets remain stored in memory in the event of a disconnect.

In one aspect of the present invention, a recovery module comprising programmed instructions is included in a protocol layer of a communication system which may become destabilized in the presence of a disconnect. A destabilized layer causes data packets correctly received and stored at a device to be eliminated from buffer memory. In a suitable embodiment, the recovery module is included within the transport protocol layer of the system 10 for stabilizing the transport protocol layer in the event of a disconnect. It is to be understood, however, that the recovery module may be included in any protocol layer in a communication system which needs to be stabilized in the event of a disconnect. A protocol layer in need of stabilization may include, for example, any end-to-end protocol layer of a communication operating system. The recovery module may be suitably included in the existing protocol with minor modifications according to well known technique for interfacing modules in a protocol. For purposes of highlighting the advantages of the present invention, it is assumed that the transmitter 20 is sequentially transmitting a data file containing data packets numbered DP 00,DP 01, ... DP 99.

Figure 3A:
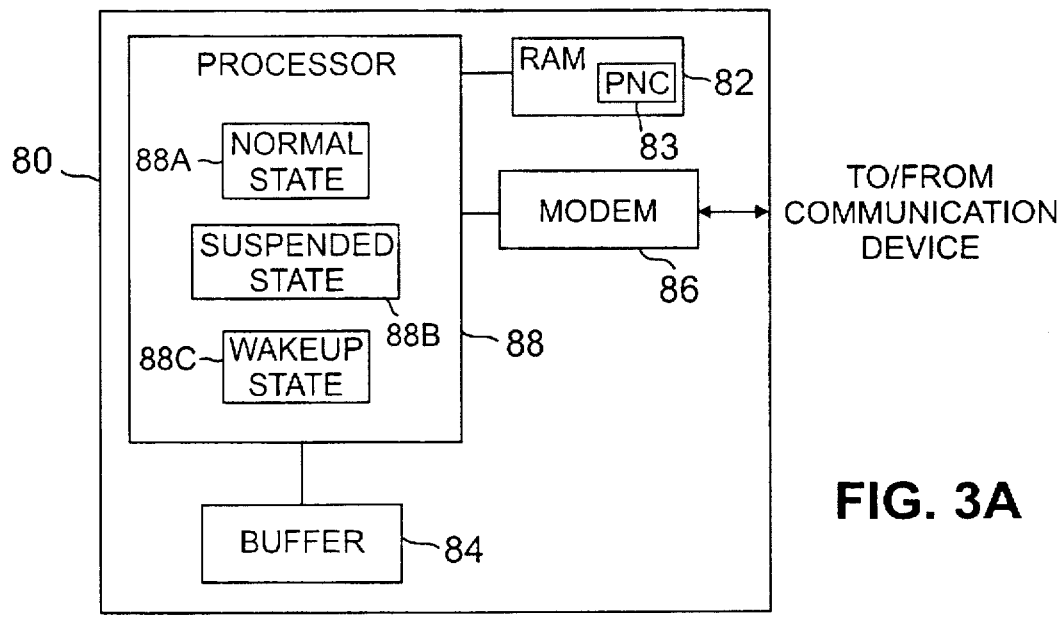
FIG. 3A illustrates an exemplary receiving device including functional blocks for implementing the present inventive technique of using a recovery module in an existing protocol layer of a communication system for handling disconnects.

FIG. 3A is an illustration of exemplary receiver 80 which may be utilized for implementing the present inventive technique of including the recovery module in an existing protocol layer. Referring to FIG. 3A, the receiver 80 may suitably comprise the interconnection of the RAM 82, the modem 86 and the buffer 84, as described above with reference to FIG. 2. The processor 88 comprises the functional processing blocks of NORMAL state processing component 88A, SUSPENDED state processing component 88B and WAKE-UP state processing component 88C for performing the operations described below with reference to FIG. 3C. A memory location 83 in the RAM 82 of the receiver 80 called a packet number counter (PNC), is utilized for storing data representative of the value of the sequence number of the last data packet which has been correctly received and stored in the buffer 84. The value of PNC indicates the data packets that still need to be transmitted for completing the transfer of a data file.

Figure 3B:
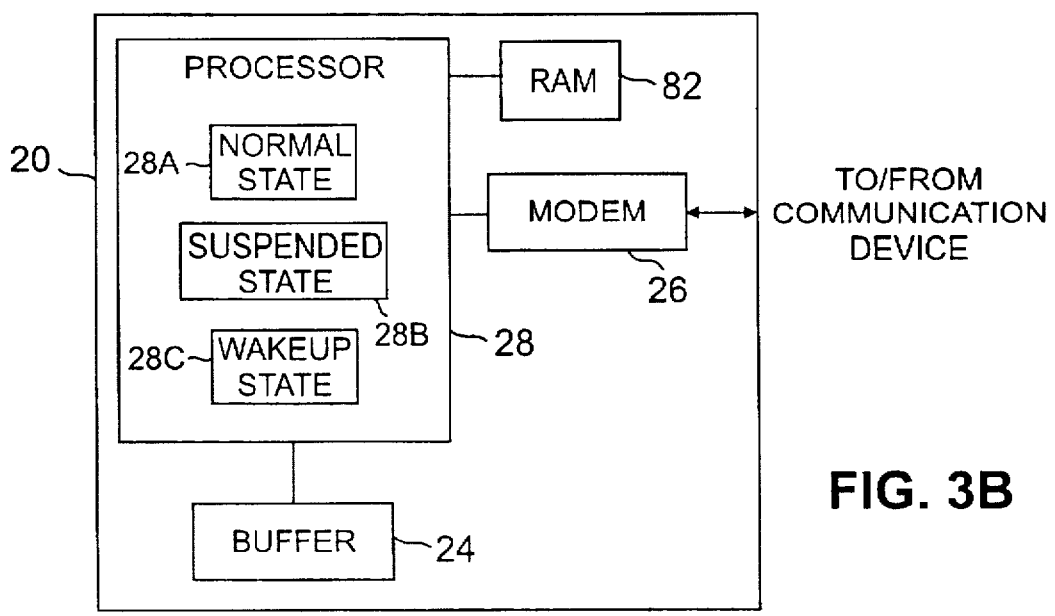
FIG. 3B illustrates an exemplary transmitting device including functional blocks for implementing the present inventive technique of using a recovery module in an existing protocol layer of a communication system for handling disconnects.

FIG. 3B is an illustration of exemplary transmitter 20 which may be utilized for implementing the present inventive technique of including the recovery module in an existing protocol layer. Referring to FIG. 3A, the transmitter 20 may suitably comprise the interconnection of the RAM 22, the modem 26 and the buffer 24, as described above with reference to FIG. 2. The processor 28 comprises the functional processing blocks of NORMAL state processing component 28A, SUSPENDED state processing component 28B and WAKE-UP state processing component 28C for performing the operations described below with reference to FIG. 3C.

Figure 3C:
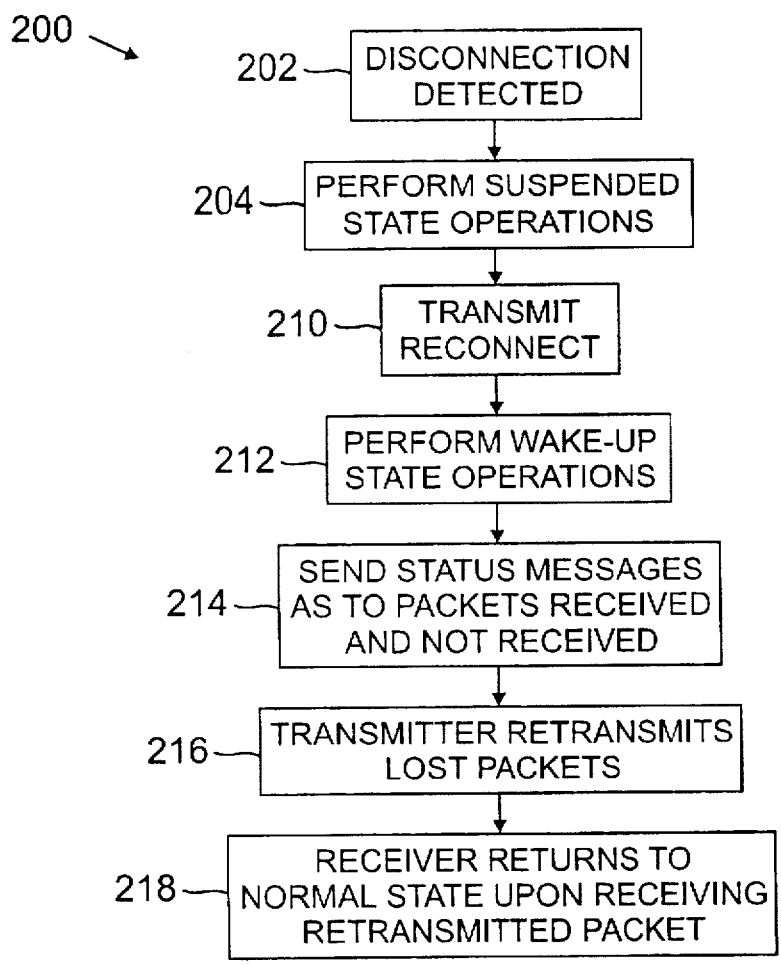
FIG. 3C is a flow diagram of a method for controlling data transfer when a disconnect occurs in accordance with programmed instructions which are implemented as a recovery module in an existing protocol layer in accordance with the present invention.

FIG. 3C shows an exemplary method 200, which may be implemented as part of the recovery module, for controlling data transfer operations in the event of a disconnect to avoid retransmissions of data packets which already have been received and stored during a communication session. For implementation of the method 200, the system 10 is said to operate in a NORMAL state when data transfer is occurring in the absence of disconnects. In the NORMAL state, the NORMAL state processing component 88A performs programmed instructions associated with the transport protocol layer for storing in the buffer 84 data packets which have been correctly received at the modem 86 during a communication session. In the event the modem 86 or a router in the network 50 invokes a disconnect during a communication session, the recovery module of the transport protocol layer assumes control of data transfer operations, and the SUSPENDED state processing components 28B and 88B and the WAKE-UP state processing components 28C and 88C perform programmed instructions for stabilizing the transport protocol layer until a communication link is restored, such that transmission of data packets begins from the sequentially numbered data packet following the last data packet correctly received and stored at the buffer 84 of the receiver 80 before the disconnect occurred.

For purposes of highlighting the present inventive techniques, it is assumed that the modem 86 invokes a disconnect during the course of a communication session, and the disconnect occurs before all data packets of a data file have been received and saved at the buffer 84 of the receiver 80. The modem 86 suitably invokes an interrupt, in other words, causes a disconnect, after determining that data packets are being received at an error rate which exceeds a predetermined threshold value. The modem 86, for example, may compute the signal-to-noise ratio (SNR) of the data packet transmission for a specified interval and compare the result with a predetermined SNR value for purposes of determining whether to invoke a disconnect. When the modem 86 invokes a disconnect, the physical connection between the wireless data link 27 and the receiver 80 is effectively eliminated, thereby severing the communication link between the transmitter 20 and the receiver 80.

The NORMAL state processing component 88A operates to store data at PNC in the RAM 82 for tracking the progression of data packet transmission. The value of PNC is updated for each data packet correctly received and stored at the buffer 84. For ease of reference, it is to be understood that reference hereinafter to the transmission and reception of message signals by a communications device, such as the reference 20, is a shorthand reference to the performance of such operations by the modem in the communications device in accordance with control signals suitably provided by the processing means of the device.

Referring to FIG. 3C, when a disconnect occurs, in step 202, the modem 86 provides control signals to the NORMAL state processing component 88A indicating the presence of a disconnect condition. The NORMAL state processing component 88A then ceases to perform NORMAL state operations associated with the transport protocol layer, and immediately thereafter, the SUSPENDED state processing component 88B begins to perform operations associated with the recovery module. Similarly, the SUSPENDED state processing component 28B begins to perform operations associated with the recovery module.

In step 204, the SUSPENDED state processing component 88B directs the modem 86 to attempt continuously to restore a communication link between the transmitter 80 and the receiver 20. For example, the modem 86 may be directed to dial the modem 22 in the transmitter 20 until a link is re-established. Further, the SUSPENDED state processing component 88B provides that those data packets correctly received and stored in the buffer 84 before the disconnect occurred continue to be retained therein. In prior art communication systems, data packets stored in the buffer of a communications device were not always retained therein once a disconnect occurred.

After a connection is restored, in step 210, the modem 86 transmits a reconnect message signal to the SUSPENDED state processing component 28B and provides reconnect control signals to the SUSPENDED state processing component 88B indicating restoration of the communication link. Upon being shifted to control operations, the SUSPENDED state processing component 28B waits to receive such signals. Upon reception of the reconnect signals, in step 212, the WAKE-UP state processing components 88C and 28C begin performing operations and the SUSPENDED state processing components 28B and 88B cease to perform operations.

During the performance of WAKE-UP state operations, data packet transfer between the transmitter 20 and receiver 80 is synchronized to provide for transmission of only those data packets which are not currently stored in the buffer 84 of the receiver 80. In particular, the WAKE-UP state processing component 88C retrieves the value in PNC from the RAM memory 82, and, based on the value of PNC, provides that a status message signal be transmitted to the transmitter 20 for routing to the WAKE-UP state processing component 22C. The status message signal contains data identifying those data packets previously received and stored at the buffer 84 before the disconnect occurred. For example, if data packet DP 30 has been transmitted just before a disconnect occurs and the value of PNC is and remains equal to 20, the previously transmitted data packets DP 21, DP 22, ... DP 29 would not have been correctly received and stored in the buffer 84. In this case, the status message signal would include information indicating that data packets DP 21, DP 22 ... DP 29 have not been received and stored in the buffer 84. After the processor 28 receives and processes a status message signal, in step 216, the processor 28 begins performing NORMAL state operations.

In step 216, the WAKE-UP state processing component 28C, based on the value of PNC represented in the status message signal, directs the modem 22 to begin transmitting those data packets of the data file not yet received and stored at the buffer 84 starting from that data packet having a sequence number corresponding to the value of PNC plus one. The data packet transmissions may involve retransmission of previously transmitted data packets not correctly received at the receiver 80 as well as the original transmission of data packets. In step 218, the NORMAL state processing component 88A begin to perform operations upon detecting the receipt of a retransmitted data packet from the transmitter 20.

It is to be understood that, although the receiver 80 may preferably establish the data link layer communication link by transmitting status message signals to the transmitter 20 after a disconnect occurs, it may be more convenient in some situations for the transmitter 20 to start the communication. For example, in the case of an asymmetric protocol like AIRMAIL, described in detail in E. Ayanoglu, S. Paul, T. F. LaPorta, K. K. Sabnani, R. D. Gitlin, AIRMAIL: A Linklayer Protocol for Wireless Networks, Wireless Networks Vol. I, No. 1, pp. 47–60, 1995; U.S. application Ser. No. 08/282,254, filed Jul. 29, 1994, both of which are incorporated by reference herein, a transmitting base station communication device in a mobile network should start the data link-layer communication because only the transmitter has the capability to detect re-establishment of the link and the receiving mobile host in AIRMAIL cannot detect the re-establishment of a link. For example, in AIRMAIL, if the base station continues to transmit during the disconnect, a poll message will be transmitted to a mobile receiving communication device requesting its status.

Alternatively, if a mobile receiving device changes from one base station to another while the mobile device is performing SUSPENDED state operations, the mobile device, on sensing a different base station, must initiate the communication with the new base station by sending a handoff request and following the steps associated with a regular handoff, as described in the AIRMAIL protocol cited above.

In another aspect of the present invention, an additional protocol, or recovery protocol layer, may be suitably included in the protocol layer hierarchy of a communication operating system for controlling data transfer applications for avoiding retransmission of data packets correctly received and stored in a buffer when a disconnect occurs. Similar to the recovery module described above, the recovery protocol layer suitably comprises programmed instructions which provide that data packets correctly received at a receiver are retained in the receiver memory in the event of a disconnect while attempts are made to restore the communication link. A record of the sequence number of correctly received and stored data packets is maintained, based on data packets stored in the buffer, for synchronizing transmission of data packets after a connection is restored.

The recovery protocol layer is suitably included in the hierarchy of an operating system to provide for control of processing at a protocol layer, such as an end-to-end protocol layer, which may become destabilized in the event of a disconnect. For example, in the exemplary communication operating system described above for the system 10, the recovery protocol layer may be located in the hierarchy below the application layer and above the transport layer. The transport protocol layer suitably performs end-to-end operations and the application protocol performs application specific operations, such as transferring of files and sending e-mail messages.

The addition of a new and separate protocol layer to a communication operating system, rather than the modification of an existing protocol layer, provides the advantage of ease in implementation, as existing protocol layers would not require modification. However, an increased cost is incurred when disconnects are processed at an additional higher level protocol layer. An additional protocol layer increases overhead costs by requiring an additional header in a message signal for implementing the respective protocol operations. The utilization of an additional header increases the overhead associated with data transmission by consuming more bandwidth, causing decreased throughput.

Figure 4:
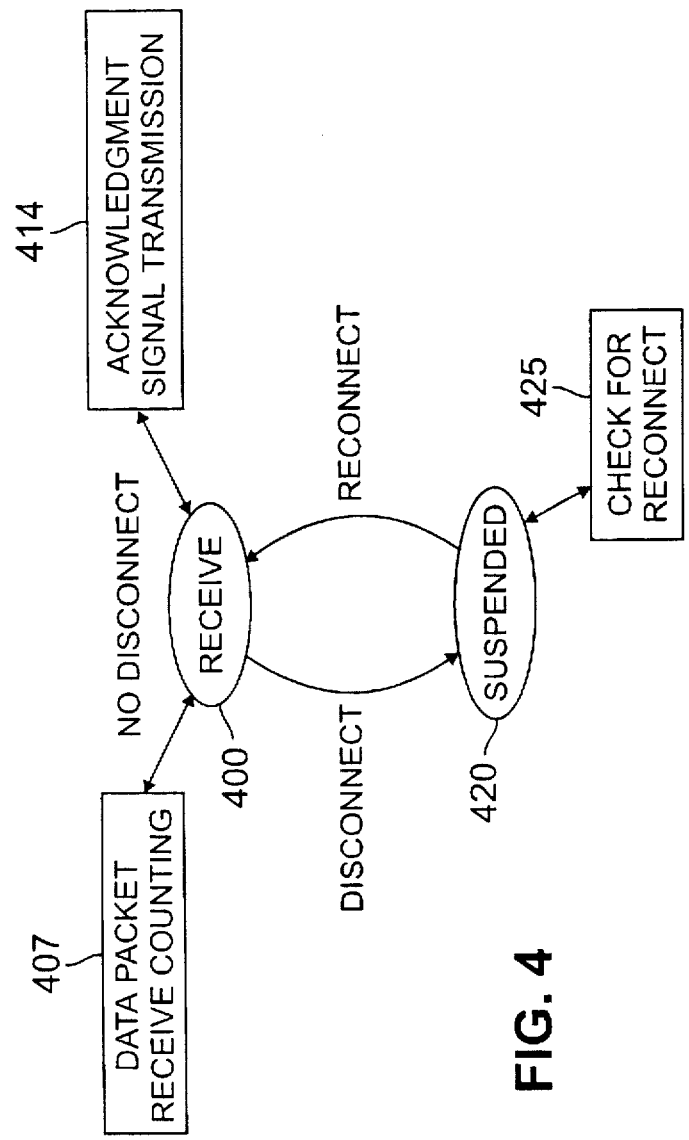
FIG. 4 is a state diagram illustrating process states, transitions and action routines for a receiver operating in accordance with programmed instructions included in a recovery protocol layer of a communication system in accordance with the present invention.

FIG. 4 is a state diagram which illustrates operations that may be suitably performed by the transmitter 20 and receiver 80, respectively, for controlling data packet transfer activities in the system 10 during a communication session between the former and latter in the event of a disconnect in accordance with the present inventive technique of including a recovery protocol layer for stabilizing another protocol layer.

The recovery protocol layer provides that the transmitter 20 operate in a TRANSMIT state and the receiver 80 operates in a RECEIVE state when data packet transfer is occurring normally, in other words, when a disconnect has not occurred. The transmitter 20 operates in SUSPENDED state and the receiver 80 operates in SUSPENDED states when a disconnect occurs. Upon restoration of the communication link, the receiver 80 operates in the RECEIVE state 400, while the transmitter 20 initially operates in a RETRANSMIT state for retransmitting originally transmitted data packets which were not correctly received and saved by the receiver 80. After performing these retransmissions, the transmitter 20 transitions from the RETRANSMIT state to the TRANSMIT state, where original data packet transmission continues from the data packet having a sequence number which is one greater than the sequence number of the last data packet transmitted before the disconnect occurred.

The recovery protocol layer is suitably implemented using the checkpointing window transmission technique for monitoring and controlling data transfer operations in the event of a disconnect for avoiding retransmission of data packets which already have been correctly received and stored in the buffer of a receiving device. Checkpointing, described in detail in S. Aggarwal, K. Sabnani, B. Gopinath, A New File Transfer Protocol, AT&T Technical Journal, Vol. 64, No. 10, pp. 2387-2411, December 1985, incorporated by reference herein, provides for the transmission of data packets during a communication session using a sliding window of transmission. A window of transmission is defined by a lower end value, L, and a higher end value H, where the values of L and H are used for referring to sequence numbers of data packets in the data file being transferred. The size of a transmitting window, W, defines the maximum difference between L and H and is computed based on a predefined checkpointing interval, which is a measure of how much temporary data loss a specific data transfer application can tolerate during the state of disconnection. During a communication session, data packets having sequence numbers between L and H are continuously transmitted and periodic transmission of acknowledgment message signals from a receiver to the transmitter must occur for indicating continuous reception of data packets. For example, the transmitter 20 continues to transmit data packets until data packets having sequence numbers between H and L, inclusive, have been transmitted. An acknowledgement message signal is suitably transmitted periodically after, for example, 8 data packets have been received in succession, to ensure continuous transmission of data packets. As the transmitter 20 receives acknowledgement signals from the receiver 80, L is continuously updated for sliding the transmitting window forward. The acknowledgement signals include data representative of the last data packet received at the receiver, and the transmitter uses this data for updating the value of L, such that transmission of data packets according to the size of the window W continues. If a disconnect occurs during a communication, data packets are no longer correctly received and stored at the receiver to provide for the transmission of acknowledgement signals in ordinary course, and in turn results in the cessation of original data packet transmission.

In accordance with the present invention, in the normal course of data transfer operations where a disconnect has not occurred, the processor 28 of the transmitter 20 would operate in the TRANSMIT state and the processor 88 of the receiver 80 would operate in the RECEIVE state 400, where the receiver 80 transmits acknowledgement message signals to the transmitter 20 indicating the sequence number of the last data packet correctly received and stored in the buffer 84. A disconnect, however, causes these acknowledgement signals not to be transmitted to and received in ordinary course at the transmitter 20. As more fully discussed below, when a disconnect occurs, the recovery protocol layer controls operations at the transmitter 20, which shift first to the SUSPENDED state, and then from the SUSPENDED state to RETRANSMIT state when a reconnect occurs before control ultimately shifts back to the TRANSMIT state. In addition, as also more fully discussed below, when a disconnect occurs, the recovery protocol layer controls operations at the receiver 80, which shift to the SUSPENDED state 420.

Figure 5A:
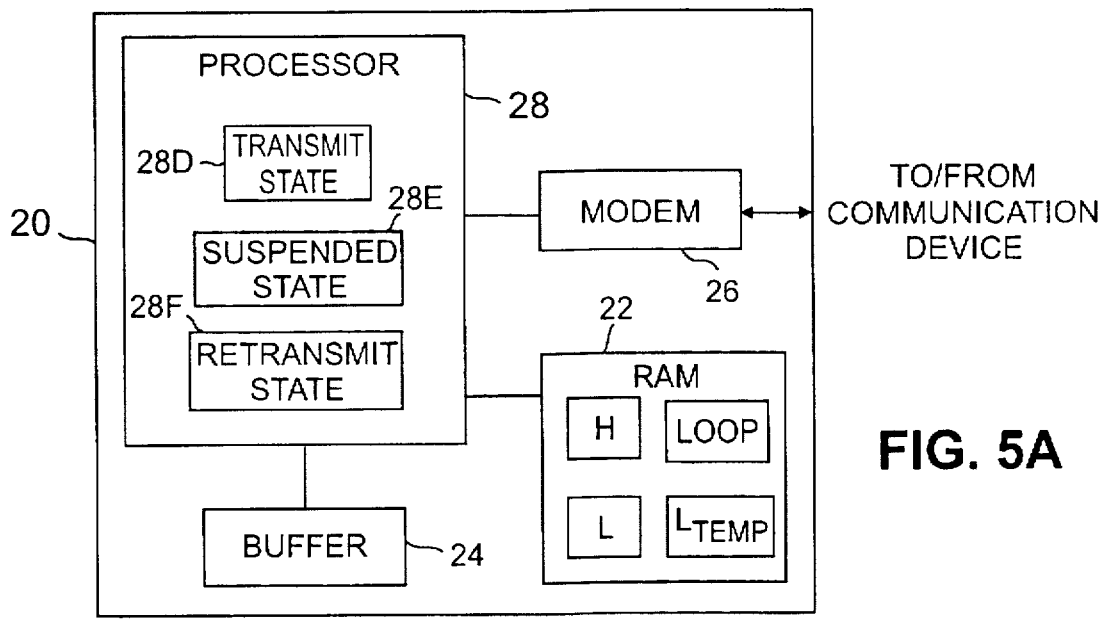
FIG. 5A illustrates an exemplary transmitting device which may perform operations for controlling data transfer when a disconnect occurs in accordance with programmed instructions which are implemented as a separate recovery protocol layer in a communication protocol system in accordance with the present invention.

FIG. 5A shows an exemplary embodiment of the transmitter 20 which may be utilized for implementing a recovery protocol layer as an independent protocol layer in accordance with the present inventive technique. Referring to FIG. 5A, the transmitter 20 may suitably comprise the interconnection of the RAM 22, the modem 26 and the buffer 24, as described above with reference to FIG. 2. The processor 28 comprises the functional processing blocks of a TRANSMIT state processing component 28D, a SUSPENDED state processing component 28E and a RETRANSMIT state processing component 28F for performing the operations described below with reference to FIGS. 6A, 6B, 6C and 6D. Current values of the lower end, L, and the higher end, H, of the transmission window W are stored in the RAM 82. In addition, data for indicating the sequence numbers of data packets which are to be retransmitted from the transmitter 20 during the RETRANSMIT state, as discussed below, are stored at memory location Ltemp in the RAM 22.

Figure 5B:
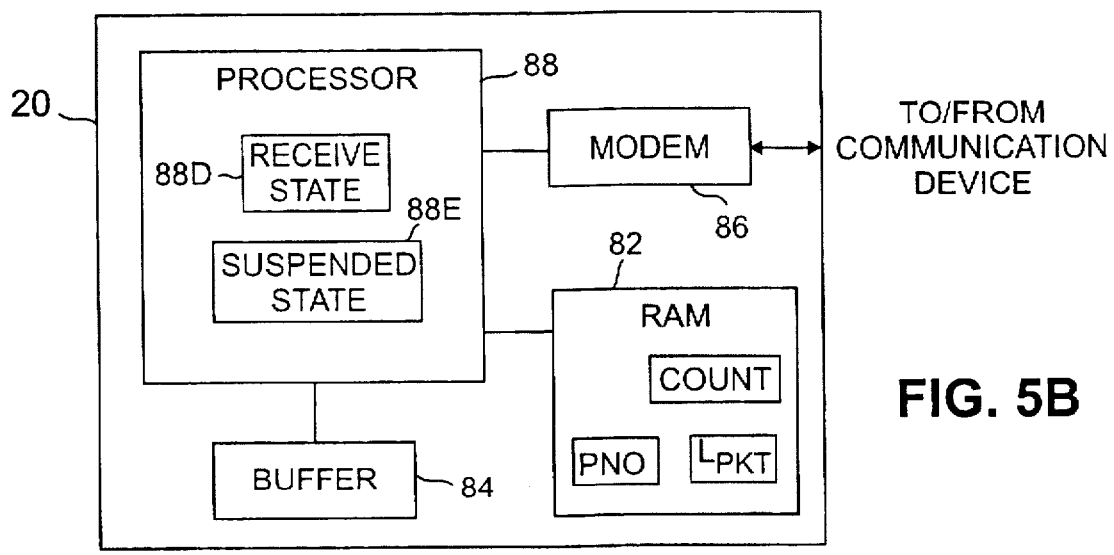
FIG. 5B illustrates an exemplary receiving device which may perform operations for controlling data transfer when a disconnect occurs in accordance with programmed instructions which are implemented as a separate recovery protocol layer in a communication protocol system in accordance with the present invention.

FIG. 5B shows an exemplary embodiment of the receiver 80 which may be utilized for implementing a recovery protocol layer as an independent protocol layer in accordance with the present inventive technique. Referring to FIG. 5B, the receiver 80 may suitably comprise the interconnection of the RAM 82, the modem 86 and the buffer 84, as described above with reference to FIG. 2. The processor 88 suitably comprises the functional processing blocks of a RECEIVE state processing component 88D and a SUSPENDED state processing component 88E for performing the operations described below with reference to FIGS. 4, 7A, 7B and 7C. Data representative of the sequence numbers of data packets being received and stored in the buffer 84 and data representations of the data packet sequence number for which an acknowledgement message signal was last transmitted are stored in memory locations PNO and Lpkt, respectively, in the RAM 82. In addition, data representative of the successive reception of data packets are stored in memory location COUNT in the RAM 82 for purposes of comparison with the size of the window W and providing for original data packet transmission.

Reference to data values which are used in processing and are stored in the RAM of a communication device for performing the present inventive technique are identified below using identical designations utilized in the method 200 above when reference is being made to similar data information. For purposes of illustration, it is assumed that original sequential data packet transmission has commenced such that the transmitter 20 is operating in the TRANSMIT state and the receiver 80 is operating in the RECEIVE state 400. Further, it is assumed that the size of the checkpointing window W is equal to 16.

The operations performed at the transmitter 20 and receiver 80 are mutually dependent, as the occurrence of a disconnect affects operation at the former and latter. While a disconnect is not present, the TRANSMIT state processing component 28D performs operations in the TRANSMIT state, which includes the simultaneous performance of a data packet transmission routine 307 and a reception of acknowledgement routine 314, which are described in further detail in FIGS. 6A and 6B, respectively. The data packet transmission routine 307 and the acknowledgement routine 314 are simultaneously performed by the TRANSMIT state processing component 28D so long as a disconnect has not occurred.

Figure 6A:
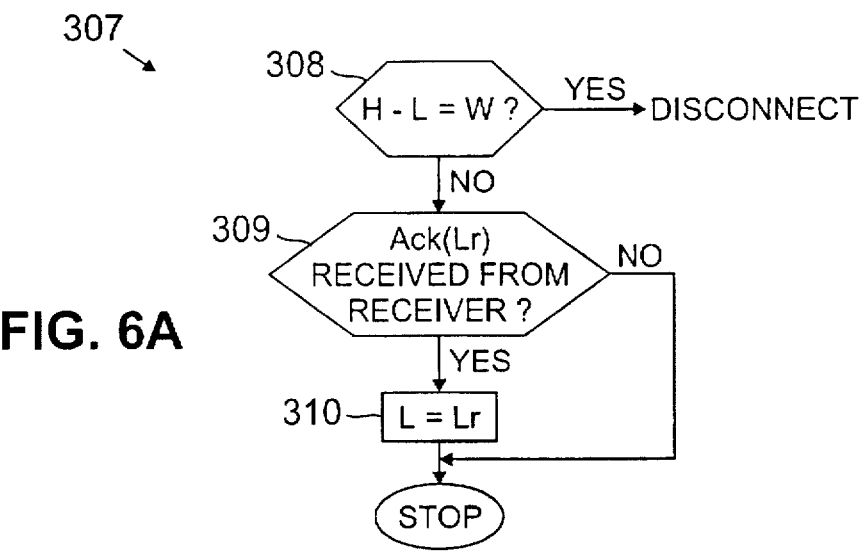
FIGS. 6A, 6B, 6C and 6D are flow diagrams of methods which may be performed by a transmitting device operating in accordance with the present invention.

Referring to FIG. 6A, for the transmit routine 307, in step 308, the TRANSMIT state processing component 28D first computes the difference between the values of H and L which are stored in the RAM 22 and compares the result to the value of W. If H−L=W, then a disconnect may be invoked. As discussed above, a disconnect may be invoked by the modem 86 of the receiver 80 or by routers in the network, as is conventional in communication system operation. As discussed below, when a disconnect occurs, further operation in the TRANSMIT state ceases, and operation by the SUSPENDED state processing component 28F in the SUSPENDED state begins. If H−L is not equal to W, in step 309, the TRANSMIT state processing component 28D determines whether an acknowledgment message signal, ACK(Lr), has been received from the receiver 80. Lr represents the value of the sequence number of the last data packet of a group of transmitted data packets which was correctly received and saved in the buffer memory 84 of the receiver 80. If an acknowledgement message signal was received, in step 310, the TRANSMIT state processing component 28D sets the value of L equal to the value of Lr. Step 310, thus, enables the transmitter 20 to maintain a record of the data packets which have been correctly received and stored at the receiver 80. For each acknowledgement message signal received at the transmitter 20, the window of transmission slides forward to provide for continuous data packet transmission, as described more fully below with reference to the transmission routine 314. The routine 307 is continually re-executed as long as a disconnect condition is not detected at step 308.

Figure 6B:
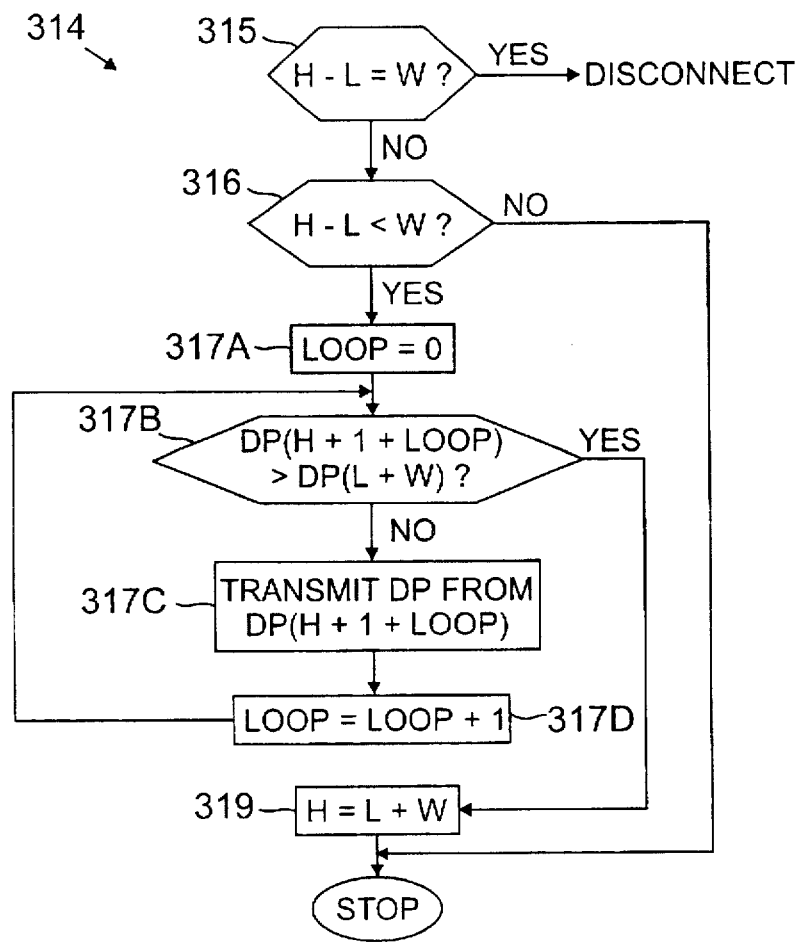

Referring to FIG. 6B, for acknowledge routine 314, in step 315, the TRANSMIT state processing component 28D compares the difference between H and L as in step 308 above for detecting a disconnect. If a disconnect is not detected, in step 316, the TRANSMIT state processing component 28D compares the difference between the values of H and L to the checkpoint value W.

If H−L<W, then in steps 317A, 317B, 317C and 317D, the TRANSMIT state processing component 28D provides for the transmission of additional data packets to the receiver 80 until the number of data packets which have been currently transmitted equals the value of the checkpointing transmission window W. In step 317A, the TRANSMIT state processing component 28D sets the value of a location LOOP in the memory 22 equal to zero. Then, in step 317B, the TRANSMIT state processing component 28D determines whether the sequence number corresponding to data packet DP (H+1+LOOP) is greater than the sequence number corresponding to data packet DP (L+W). If this is not true, in step 317C, the TRANSMIT state processing component 28D provides for the transmission of data packet DP (H+1+LOOP). Then, in step 317D, the TRANSMIT state processing component 28D increments the value of LOOP in the memory 22 by one. Step 317A is performed after step 317D. However, if the inequality condition at step 317 is true, then step 319 is executed. In other words, steps 317A, 317B, 317C and 317D provide that data packets DP (H+1) to DP (L+W) are transmitted from the transmitter 20. For example, if at step 317, H is equal to 23, L is equal to 15 and W is equal to 16, the TRANSMIT state processing component 28D would provide for the transmission of data packets DP 16 to DP 31. Finally, in step 319, the TRANSMIT state processing component 28D updates the value of H to the new higher end value of the checkpointing window based on the most recent transmission of data packets in step 317C, such that H is set equal to the sum of L and W.

Referring to FIG. 4, while a disconnect has not been detected, the RECEIVE state processing component 88D of the receiver 80 performs a data packet receive counting routine 407 and an acknowledgement signal transmission routine 414, which are more fully discussed below with reference to FIGS. 7A and 7B, respectively. The routines 407 and 414 are performed as appropriate so long as a disconnect does not occur.

Figure 7C:
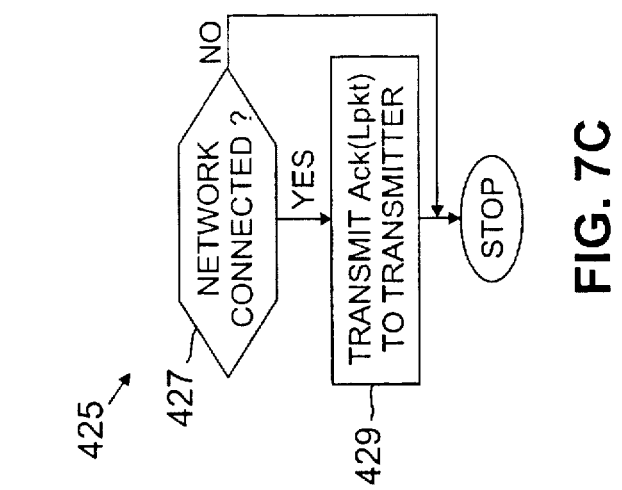
FIGS. 7A, 7B and 7C are flow diagrams of methods which may be performed by a receiving device operating in accordance with the state diagram of FIG. 4.
Figure 7B:
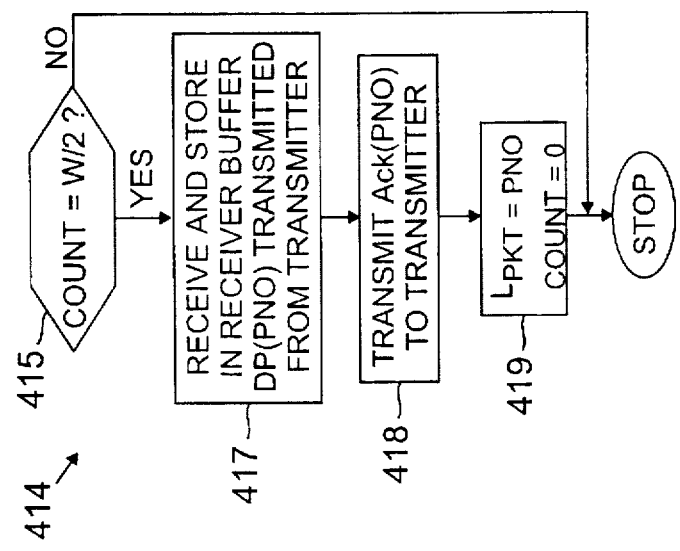
Figure 7A:
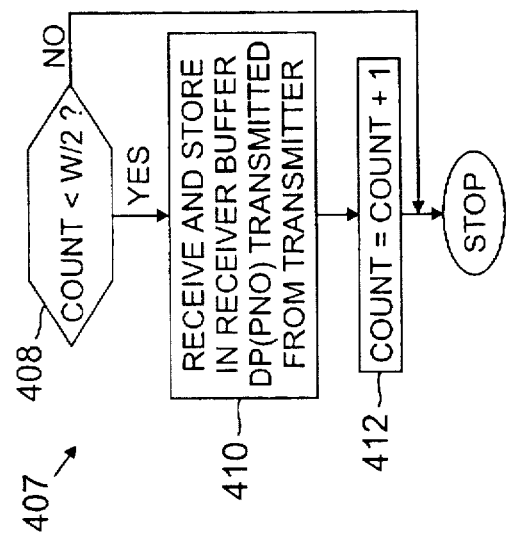

Referring to FIG. 7A, for the counting routine 407, when a disconnect is not present, in step 408, the RECEIVE state processing component 88D determines whether the value of COUNT is less than W/2. If yes, in step 410, the receiver 80 continues to receive data packets from the transmitter 20 and, as is conventional in the art, the RECEIVE state processing component 88D stores correctly received data packets in the buffer 84. The RECEIVE state processing component 88D, further, tracks the succession of data packets being correctly received by updating the value of PNO in the RAM 82 with the sequence number of the last correctly received and stored data packet. Then in step 412, the RECEIVE state processing component 88D increments the value of COUNT by one for monitoring the successive reception and storage of data packets in the buffer 84.

Referring to FIG. 7B, for the acknowledgement routine 414, when a disconnect is not present, in step 415, the RECEIVE state processing component 88D determines if the value of COUNT is equal to W/2. If yes, in step 417, the RECEIVE state processing component 88D performs operations similar to those of step 410 of the routine 407 for receiving, storing and tracking data packets transmitted by the transmitter 20 and received at the receiver 80. Then in step 418, the RECEIVE state processing component 88D transmits an acknowledgement message signal, Ack(PNO), to the transmitter 20, where PNO indicates the sequence number of the last data packet correctly received and stored in the buffer 84. Then in step 419, the RECEIVE state processing component 88D sets the value of COUNT equal to zero and sets the value of Lpkt equal to PNO. For each acknowledgement message signal transmission, therefore, an indication is provided to the transmitter 20 that W/2 data packets have been received and stored in the buffer 84.

Figure 6C:
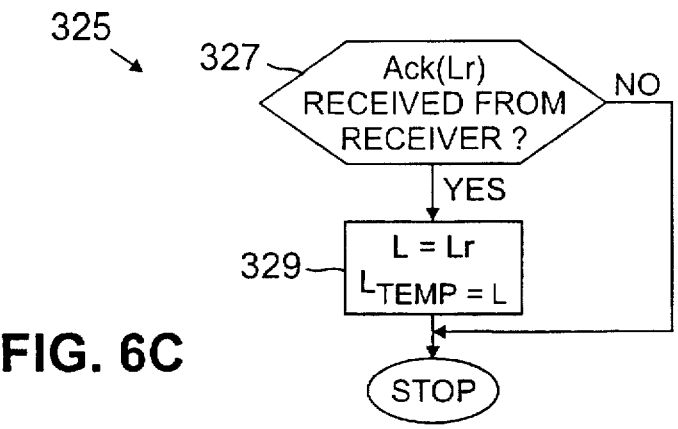

As described above, transmission of acknowledgement message signals in ordinary course indicates a disconnect has not occurred. The receiver 80, thus, remains in the RECEIVE state 400 and the transmitter 20 remains in the TRANSMIT state as long as a disconnect is not invoked. In contrast, when a disconnect occurs, the transmitter 20 would not continue to receive acknowledgment message signals from the receiver 80 as COUNT would not continue to be incremented in step 412 of the routine 407. As the transmitter 20 does not receive acknowledgement message signals from the receiver 80, steps 309 and 310 will not be performed and L will not be updated. However, the transmitter 20 would continue to transmit data packets per routine 314 until H=L+W. When the condition H−L=W is true, however as in steps 308 and 315, the transmitter 20 begins operating in the SUSPENDED state. In the SUSPENDED state, the transmitter 20 does not transmit data packets to the receiver 80. In addition, during the SUSPENDED state, the modems 26 and 86 of the transmitter 20 and the receiver 80, respectively, suitably attempt to restore a communication link between the former and latter in accordance with standard techniques. While in the SUSPENDED state, the SUSPENDED state processing component 28E performs a check-for-reconnect routine 325, as shown in FIG. 6C. Referring to FIG. 4, while in the SUSPENDED state 420, the SUSPENDED state processing component 88E performs a check-for-reconnect routine 425, as shown in FIG. 7C.

The SUSPENDED state processing component 88E operates in the SUSPENDED state 420 when a disconnect has occurred, and provides that all data packets previously correctly received and stored in the buffer 84 as part of the requested data file transfer continue to be stored in the buffer 84, despite the occurrence of the disconnect.

Figure 6D:
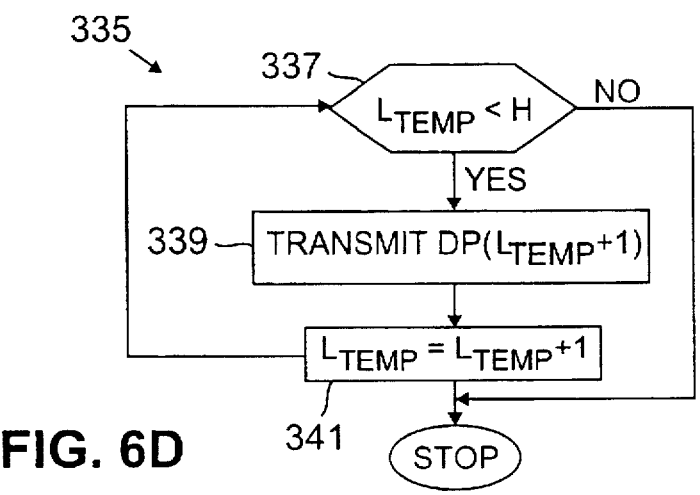

Referring to FIG. 7C, for the routine 425, in step 427, the SUSPENDED state processing component 88D detects whether the communication link to the transmitter 20 has been re-established from the receiver 80. For example, the modem may be able to establish a connection after several attempts are made, and then transmit message signals to the SUSPENDED state processing component 88E of the receiver 80 indicating that a reconnect has occurred. If such message signals are not detected, the SUSPENDED state processing component 88E continues to operate in the SUSPENDED state 420. Otherwise, in step 429, the SUSPENDED state processing component 88E transmits an acknowledgment message signal, ACK(Lpkt), to the transmitter 20, where Lpkt represents the sequence number of the last data packet in sequence received and stored at the buffer 84 at the time the last acknowledgement message signal was transmitted at step 418. For example, the last packet H transmitted by the transmitter 20 may have a sequence number that exceeds Lpkt, which indicates to the transmitter 20 that there are H-Lpkt outstanding data packets that the receiver 80 did not receive as a result of the disconnect. In a preferred embodiment, these few, if any, data packets are retransmitted, as more fully discussed below in connection with FIG. 6D. When H is equal to Ltemp, the transmitter 20 shifts operation from the RETRANSMIT state to the TRANSMIT state. After performing step 429, the receiver 80 then operates in the RECEIVE state 400.

Referring to FIG. 6C, for the routine 325, in step 327, the SUSPENDED state processing component 28E detects whether an acknowledgement message signal, Ack(Lr), has been received from the receiver 80. The reception of an acknowledgement message signal at the transmitter 20 which has been transmitted from the receiver 80 indicates that a connection link between the transmitter 20 and receiver 80 has been restored. If an acknowledgement message signal has been received, in step 329, the SUSPENDED state processing component 28E sets the value of L equal to the value Lr contained in the acknowledgment message signal at step 327. Further, the SUSPENDED state processing component 28E sets Ltemp equal to the value of L for facilitating retransmission of data packets previously transmitted but not received and stored at the receiver 80. If an acknowledgment message signal has not been received at step 327, the SUSPENDED state processing component 22 continues to perform the SUSPENDED state operations, as a connection link has not been restored.

The RETRANSIT state processing component 28F performs operating in the RETRANSMIT state once a reconnect is detected and, in particular, performs a retransmit data packet routine 335, shown in FIG. 6D. The Ack(Lr) message signal which was received at step 327 of the routine 325 indicates that a connection link to the transmitter 20 has been restored. Referring now to FIG. 6D, in step 337, the RETRANSMIT state processing component 28F determines whether Ltemp is less than H. This step ensures the retransmission of all data packets which have been previously transmitted before the disconnect occurred, but not necessarily received and stored in the buffer 84. If yes, in step 339, the RETRANSMIT state processing component 28F provides control signals to the modem 26 to provide for the retransmission of the data packet whose sequence number corresponds to DP (Ltemp+1), as the data packet DP (Ltemp) was the last correctly received and stored data packet. In step 341, the RETRANSMIT state processing component 28F sets Ltemp equal to Ltemp+1. After step 341, the RETRANSMIT state processing component 28F performs step 337. In other words, the RETRANSMIT state processing component 28F continues to perform steps 337 to 341 until all data packets with sequence numbers less than or equal to H have been retransmitted. These data packets are retransmitted to the receiver 80 because they may not have been correctly received and stored at the receiver 80 based on an original transmission that occurred before the disconnect.

For example, if L=7, H=23 and W=16 and an acknowledgement message signal Ack(10) is received by the transmitter 20 in step 327, the transmitter 20 would retransmit data packets DP 11 through DP 23 while in the RETRANSMIT state. After these previously transmitted data packets are retransmitted, Ltemp would have been incremented to H. When this occurs, the transmitter 20 begins operating in the TRANSMIT state.

Thus, the continued storage of data packets in the buffer 84 during a disconnect enables the transmitter 20 to synchronize the retransmission of data packets and the original transmission of data packets of a data file for avoiding unnecessary retransmissions of data packets already stored in the buffer 24. As a result, improved throughput efficiency is obtained. An entire data file of data packets may be stored in a buffer more quickly to allow for quicker data transfer application processing. For example, for a data file transfer of a map of an area, data for reconstructing the map would be completely received at an earlier point in time, thereby allowing the map to be usefully displayed to the user providing added convenience. It is to be understood that the embodiments and variations shown and described above are illustrative of the principles of this invention only and that various modifications may be implemented by those skilled in the art without departing from the scope and spirit of the invention.

We claim:

1. A method for controlling data transfer operations comprising the steps of:

(a) initiating a data file transmission from a first communication device to a second communication device over a communication link, said data file comprising a plurality of sequentially numbered data packets, said transmission involving the sequential transmission of said data packets;

(b) storing data packets correctly received at a memory in said second communication device;

(c) maintaining a record in the second communication device memory of the sequence numbers of those data packets stored in the second communication device memory; and (d) in response to receiving a signal indicative of a disconnect in the communication link, retaining in the second communication device memory those data packets stored in the second device memory before the disconnect occurred, such that the first communication device need transmit to the second communication device, once the communication link is re-established, only those data packets of the data file not previously stored in the second communication device memory.

2. The method of claim 1, further comprising the step of:

(e) transmitting a status message signal from the second communication device to the first communication device, once the communication link is re-established, said status message signal indicating the sequence number of the last data packet in sequence received and stored in the second communication device memory.

3. The method of claim 2, further comprising the step of:

(f) retransmitting to the second communication device from the first communication device the data packets previously transmitted from the first communication device but not stored in the second communication device memory.

4. The method of claim 2, further comprising the step of:

(f) transmitting to the second communication device from the first communication device data packets not previously transmitted from the first communication device to the second communication device.

5. The method of claim 1, wherein programmed instructions corresponding to the operations performed in steps (a) through (d) are included in an existing protocol layer of a communications system, said existing protocol layer performing communication operations as well as the operations performed in steps (a) through (d), said system comprising a plurality of protocol layers.

6. The method of claim 1, wherein programmed instructions corresponding to the operations performed in steps (a) through (d) are included in an independent protocol layer of a communications system, said independent protocol layer operative to perform only the operations of steps (a) through (d), said system comprising a plurality of protocol layers.

7. A method for controlling data transfer operations comprising the steps of:

initiating a data file transmission from a first communication device to a second communication device over a communication link, said data file comprising a plurality of sequentially numbered data packets, said transmission involving the sequential transmission of said data packets;

maintaining checkpointing window transmission values in a memory of said first communication device for controlling the transmission of said data packets, said window transmission values including a lower and higher bound value and a window size value;

transmitting data packets in sequence as windows of information according to the lower and upper bound transmission values and the window size value;

monitoring the successive reception of the data packets at the second communication device;

storing data packets correctly received at said second communication device in a memory of said second communication device;

storing data concerning the successive reception of the data packets received in a counter location in the second communication device memory;

transmitting acknowledgement signals periodically from the second communication device to the first communication device for indicating the reception and storage of said data packets, said acknowledgment signals being transmitted when the successive count value is equal to a fraction of the window size value;

updating the value of the lower bound value for each acknowledgement signal received at the first communication device;

ceasing data packet transmission when a disconnect occurs;

receiving at the first communication device an acknowledgement signal from the second device indicating re-establishment of the link; and retransmitting data packets in sequence, after the first communication device received the link re-establishment acknowledgement signal, starting from the data packet having a sequence number one greater than the last data packet stored in the second device memory corresponding to the last data packet transmitted before the disconnection occurred.

8. The method of claim 7, further comprising the steps of:

receiving a signal at the second device indicating the re-establishment of the link; and, transmitting a sequence number acknowledgment signal from the second device to the first communication device indicating the sequence number of the last packet in sequence received and stored in the second device memory.

9. The method of claim 7, wherein the operations of said method are performed as part of an independent protocol layer included in a communication operating system, said system comprising a plurality of protocol layers.

10. A system for controlling data transfer operations comprising:

a first communication device comprising at least one processor and a memory;

a second communication device comprising at least one processor and a memory, said first communication device being linked to said second device over a communication link when said first communication device performs the operation of initiating a data file transmission to the second communication device, said data file comprising a plurality of sequentially numbered data packets, said transmission involving the sequential transmission of said data packets;

receiver for receiving at said second communication device said data packets transmitted from said first communication device;

a memory for storing said received data packets in said second communication device memory;

said second communication device memory maintaining a record of the sequence numbers of those data packets stored in the second communication device memory, wherein said processor of said second communication device in response to receiving a signal indicative of a disconnect in the communication link, retains in the second communication device memory those data packets stored in the second communication device memory before the disconnect occurred, such that the first communication device need transmit to the second communication device, once the communication link is re-established, only those data packets of the data file not previously stored in the second communication device memory.

11. The system of claim 10, wherein said processor of said second communication device further performs the operation of:

generating transmitting control signals to provide for transmission of a status message signal to the first communication device, once the communication link is re-established, indicating the last data packet in sequence stored in the second communication device memory.

12. The system of claim 11, wherein said processor of said first communication device further performs the operation of:

generating retransmitting control signals to provide for retransmission of the data packets previously transmitted from the first communication device but not stored in the second communication device memory.

13. The system of claim 10, wherein said processor of said first communication device further performs the operation of:

generating transmitting control signals to provide for the transmission of data packets not previously transmitted from said communication first device.

14. The system of claim 10, wherein programmed instructions corresponding to the operations performed by the processors of said first and second communication devices, respectively, are included as part of an existing protocol layer of a communication system, said existing protocol layer performing communication operations as well as the steps of initiating a data file transmission from the first communication device to the second communication device, receiving data packets at the second communication device, storing received data packets in the memory of the second communication device, maintaining in the memory of the second communication device a record of the sequence numbers of the data packets stored in the second communication device memory, and in response to receiving at the second communication device a signal indicative of a disconnect in the communication link, retaining in the second communication device memory the data packets stored in the second communication device memory before the disconnect occurred, said instructions being stored in the memories of said first and second communication devices, respectively.

15. The system of claim 10, wherein programmed instructions corresponding to the operations performed by the processors of said first and second communication devices, respectively, are included as part of an independent protocol of a communication system, said independent protocol layer performing the steps of initiating a data file transmission from the first communication device to the second communication device, receiving data packets at the second communication device, storing received data packets in the memory of the second communication device, maintaining in the memory of the second communication device a record of the sequence numbers of the data packets stored in the second communication device memory, and in response to receiving at the second communication device a signal indicative of a disconnect in the communication link, retaining in the second communication device memory the data packets stored in the second communication device memory before the disconnect occurred, said instructions being stored in the memories of said first and second communication devices, respectively.

16. A system for controlling data transfer operations, comprising:

a first communication device comprising at least one processor and a memory;

a second communication device comprising at least one processor and a memory, said first communication device being linked to said second communication device over a communication link when said first communication device performs the operation of initiating a data file transmission to the second communication device, said data file comprising a plurality of sequentially numbered data packets, said transmission involving the sequential transmission of said data packets;

said first communication device processor maintaining checkpointing window transmission values in said first communication device memory for controlling the transmission of said data packets, said window transmission values including a lower and higher bound value and a window size value;

said first communication device transmitting data packets in sequence according to the lower and upper bound values;

said second communication device monitoring the successive reception of data packets;

said second communication device processor storing data concerning the successive reception of the data packets in a counter location in the second communication device memory;

said second communication device periodically transmitting acknowledgement signals to the first communication device indicating the reception and storage of said data packets, said acknowledgement signals being transmitted when the successive count value is equal to a fraction of the window size value;

said first communication device processor updating the value of the lower bound value for each acknowledgement signal received;

said first communication device ceasing data packet transmission when a disconnect occurs;

said first communication device receiving an acknowledgement signal from the second communication device indicating re-establishment of the link; and said first communication device retransmitting data packets in sequence, after the first communication device received the link re-establishment acknowledgement signal starting from the data packet having a sequence number one greater than the last data packet stored in the second communication device memory corresponding to the last data packet transmitted before the disconnection occurred.

17. The system of claim 15, wherein said second communication device receives a signal indicating the re-establishment of the link and transmits a sequence number acknowledgment signal to the first communication device indicating the sequence number of the last packet in sequence received and stored in the second communication device memory.

18. The system of claim 15, wherein the operations of said system are performed as part of an independent protocol layer included in a communication operating system, said system comprising a plurality of protocol layers.

* * * * *